(12) United States Patent
Choi et al.

(10) Patent No.: US 11,341,900 B2
(45) Date of Patent: May 24, 2022

(54) DISPLAY DEVICE HAVING OUTPUT VOLTAGE OF DISPLAY DRIVER DROPPED

(71) Applicant: SAMSUNG ELECTRONICS CO., LTD., Suwon-si (KR)

(72) Inventors: Shinwook Choi, Suwon-si (KR); Youngsoo Kim, Suwon-si (KR); Kangmoon Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 128 days.

(21) Appl. No.: 16/770,671

(22) PCT Filed: Mar. 6, 2019

(86) PCT No.: PCT/KR2019/002553
§ 371 (c)(1),
(2) Date: Jun. 8, 2020

(87) PCT Pub. No.: WO2019/172625
PCT Pub. Date: Sep. 12, 2019

(65) Prior Publication Data
US 2021/0174735 A1    Jun. 10, 2021

(30) Foreign Application Priority Data
Mar. 7, 2018    (KR) ........................ 10-2018-0026992

(51) Int. Cl.
*G09G 5/00* (2006.01)
*G09G 3/32* (2016.01)
(Continued)

(52) U.S. Cl.
CPC .............. *G09G 3/32* (2013.01); *H05B 45/375* (2020.01); *H05B 45/48* (2020.01); *G09G 2330/021* (2013.01)

(58) Field of Classification Search
CPC .................. H05B 45/375; H05B 45/48; G09G 2330/021; G09G 3/30; G09G 3/34; G09G 5/00; G06F 3/038
See application file for complete search history.

(56) References Cited

U.S. PATENT DOCUMENTS

| 8,519,921 B2 | 8/2013 | Lee et al. |
| 9,123,298 B2 | 9/2015 | Kim et al. |

(Continued)

FOREIGN PATENT DOCUMENTS

| KR | 10-0581916 B1 | 5/2006 |
| KR | 10-2008-0090923 A | 10/2008 |

(Continued)

OTHER PUBLICATIONS

International Search Report dated Jul. 5, 2019 issued by the International Searching Authority in counterpart International Application No. PCT/KR2019/002553 (PCT/ISA/210).

(Continued)

*Primary Examiner* — Pegeman Karimi
(74) *Attorney, Agent, or Firm* — Sughrue Mion, PLLC

(57) ABSTRACT

Disclosed is a display device including a power transformer converting an input voltage into a specified voltage, a display driver including a rectifier rectifying a voltage converted through the power transformer and a converter converting a voltage rectified through the rectifier based on a control signal for outputting an image, and a display panel receiving a converted voltage through the display driver to display the image. The display driver may include a voltage drop unit dropping a voltage input through the rectifier. Other various embodiments as understood from the specification are also possible.

9 Claims, 9 Drawing Sheets

(51) Int. Cl.
*H05B 45/375* (2020.01)
*H05B 45/48* (2020.01)

(56) References Cited

U.S. PATENT DOCUMENTS

| | | | |
|---|---|---|---|
| 9,224,327 B2 | 12/2015 | Hyeon et al. | |
| 2009/0289881 A1* | 11/2009 | Zheng | H02M 7/064 |
| | | | 345/87 |
| 2012/0187863 A1* | 7/2012 | Nonaka | H05B 45/3725 |
| | | | 315/291 |
| 2013/0169517 A1* | 7/2013 | Cho | G09G 3/3208 |
| | | | 345/82 |
| 2016/0119988 A1 | 4/2016 | Ruan et al. | |
| 2017/0245339 A1* | 8/2017 | Modepalli | H05B 45/375 |
| 2018/0238531 A1* | 8/2018 | Hsia | H05B 45/3578 |

FOREIGN PATENT DOCUMENTS

| | | |
|---|---|---|
| KR | 10-2013-0043023 A | 4/2013 |
| KR | 10-2013-0076413 A | 7/2013 |
| KR | 10-2013-0076669 A | 7/2013 |

OTHER PUBLICATIONS

Written Opinion dated Jul. 5, 2019 issued by the International Searching Authority in counterpart International Application No. PCT/KR2019/002553 (PCT/ISA/237).

* cited by examiner

DISPLAY DEVICE HAVING OUTPUT VOLTAGE OF DISPLAY DRIVER DROPPED

CROSS-REFERENCE TO RELATED APPLICATIONS

This application is a National Stage of International Application No. PCT/KR2019/002553, filed Mar. 6, 2019, claiming priority based on Korean Patent Application No. 10-2018-0026992, filed Mar. 7, 2018, the contents of all of which are incorporated herein by reference in their entirety.

TECHNICAL FIELD

Embodiments disclosed in this specification relate to a technology of controlling an output voltage of a display device.

BACKGROUND ART

A display device may display an image received from the outside or an image stored in an internal storage device. In this regard, the display panel included in the display device may include a light emitting device such as an light emitting diode (LED), an organic light emitting diode (OLED), or the like for displaying an image by emitting light.

With regard to the operation of the display device, a power supply device may supply power to the display device. For example, the power supply device may convert alternating current (AC) power received from an external power source into direct current (DC) power to supply power to the display device.

DISCLOSURE

Technical Problem

A display device including a large-sized display panel (e.g., a display panel having a size of 50 inches or more) needs to implement a display panel with a plurality of channels in consideration of stability according to the specifications of devices included in a driving circuit. In this case, the manufacturing cost of the display device may increase, and the thickness of the display device itself may increase.

Various embodiments disclosed in this specification may provide a display device capable of reducing the number of channels for controlling the display panel, by dropping the voltage input to a driving circuit for driving the display panel.

Technical Solution

According to various embodiments disclosed in this specification, a display device may include a power transformer converting an input voltage into a specified voltage, a display driver including a rectifier rectifying a voltage converted through the power transformer and a converter converting a voltage rectified through the rectifier based on a control signal for outputting an image, and a display panel receiving a converted voltage through the display driver to display the image. The display driver may include a voltage drop unit dropping a voltage input through the rectifier.

According to an embodiment disclosed in this specification, the voltage drop unit may be connected in series to the display panel.

According to an embodiment disclosed in this specification, the voltage drop unit may be connected on a path of a current formed by a negative voltage applied by the rectifier.

According to an embodiment disclosed in this specification, the rectifier may apply a positive voltage to the converter to supply a first current to the display panel and may apply a negative voltage to the converter to supply a second current to the voltage drop unit.

According to an embodiment disclosed in this specification, the voltage drop unit may include a capacitor.

According to an embodiment disclosed in this specification, a voltage supplied to the display panel through the display driver may be not less than a voltage capable of displaying an image on the display panel without loss for image information.

According to an embodiment disclosed in this specification, the converter may be a buck converter.

According to an embodiment disclosed in this specification, the display panel may display an image by a specified size or more.

According to an embodiment disclosed in this specification, the display panel may include pixels, of which a number is not less than a specified number.

According to an embodiment disclosed in this specification, the display panel may receive a specified voltage or higher to operate.

Advantageous Effects

According to various embodiments disclosed in this specification, it is possible to reduce the number of channels of a display panel in a state where the stability and performance of the display device is maintained, by dropping the voltage input to a driving circuit for driving the display panel.

According to an embodiment disclosed in this specification, the thickness of the display device may be reduced and the manufacturing cost of the display device may be reduced, based on the reduction in the number of channels.

Besides, a variety of effects directly or indirectly understood through the disclosure may be provided.

DESCRIPTION OF DRAWINGS

With regard to description of drawings, the same or similar components may be marked by the same or similar reference numerals.

MODE FOR INVENTION

Hereinafter, various embodiments of the disclosure will be described with reference to accompanying drawings.

However, those of ordinary skill in the art will recognize that modification, equivalent, and/or alternative on various embodiments described herein may be variously made without departing from the scope and spirit of the disclosure. With regard to description of drawings, similar components may be marked by similar reference marks/numerals.

Figure 1:
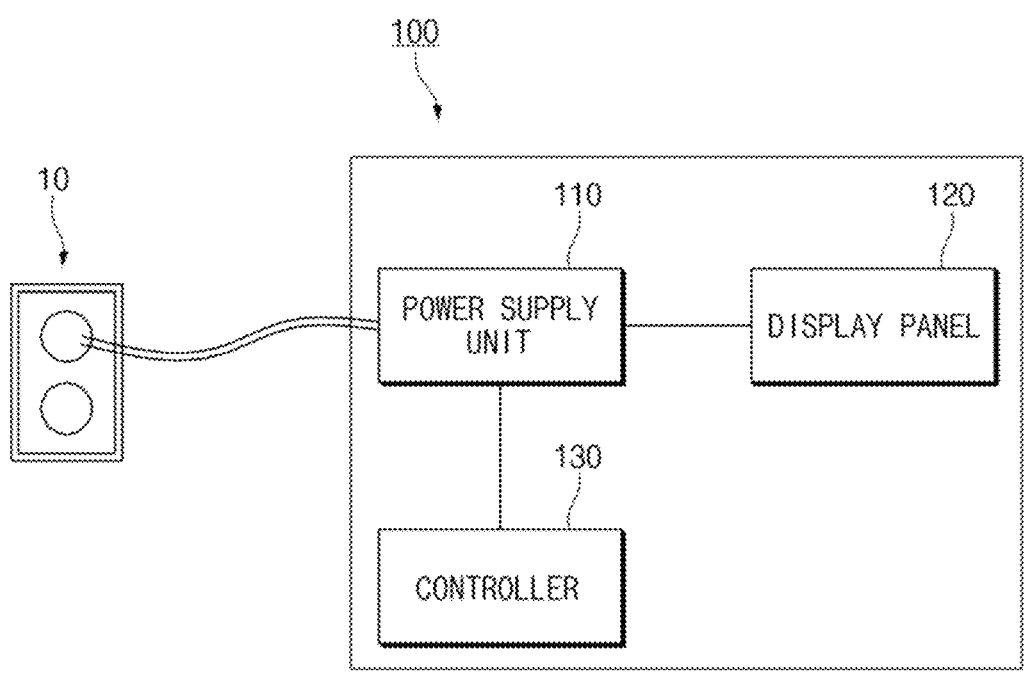
FIG. 1 is a view illustrating that a display device is connected to an external power source, according to various embodiments.

FIG. 1 is a view illustrating that a display device is connected to an external power source, according to various embodiments.

Referring to FIG. 1, a display device 100 may include a power supply unit 110, a display panel 120, and a controller 130.

According to an embodiment, the power supply unit 110 may receive power from an external power supply 10 and then may supply power necessary for each configuration of the display device 100 to operate. For example, the power supply unit 110 may supply driving power to the display panel 120 and the controller 130. According to an embodiment, the power supply unit 110 may rectify the power supplied from the external power supply 10. For example, the power supply unit 110 may convert the supplied AC power into DC power and may supply the converted DC power as power to the display panel 120 and the controller 130. For example, the external power supply 10 may be wall mount power supply. The external power supply 10 may supply the AC power of a specified magnitude to the power supply unit 110.

According to an embodiment, the power supply unit 110 may correct the power factor of the supplied power. According to an embodiment, the power supply unit 110 may reduce the lost power by improving the power factor of the supplied power. For example, the power supply unit 110 may improve the power factor by correcting the power factor of the supplied power to be close to 1.

According to an embodiment, the display panel 120 may display an image (or a video image). For example, the display panel 120 may display an image depending on the received image information. For example, the image information may be stored in an internal memory or may be received from an external device.

According to an embodiment, the display panel 120 may include at least one light emitting device for displaying the image. For example, the display panel 120 may be composed of a plurality of pixels including a backlight that transmits light to a liquid crystal display (LCD) to display an image. For example, the backlight may include a light emitting diode (LED) backlight. For another example, the display panel 120 may be composed of a plurality of pixels including an organic light emitting diode (OLED).

According to an embodiment, the light emitting device included in the plurality of pixels of the display panel 120 may operate by forming at least one channel. According to an embodiment, the display panel 120 may receive power necessary to operate in units of channels. In this regard, the display panel 120 may include a driving circuit for operating each channel. According to an embodiment, the number of channels of the display panel 120 may be determined depending on the number of light emitting elements capable of being disposed in the channel. For example, the number of channels of the plurality of light emitting elements included in the display panel 120 of a specified size may be determined depending on the number of light emitting elements capable of being disposed in the channel of the display panel 120. For example, the number of light emitting elements that may be disposed in the channel may be determined based on the stability according to the specifications of the elements included in a driving circuit.

According to an embodiment, the controller 130 may control overall operations of the display device 100. According to an embodiment, the controller 130 may control the power supply unit 110 and the display panel 120 to output a specified image.

According to an embodiment, the controller 130 may control the power supply unit 110 to control the voltage supplied to the display panel 120. For example, the controller 130 may control a transformer to control the voltage supplied to the display panel 120. According to an embodiment, the controller 130 controls the display panel 120 to display an image on the display panel 120. For example, the controller 130 may display an image on the display panel 120 depending on image information.

When the display device 100 includes a large-sized display panel (e.g., a display panel having a size of 50 inches or more), there may be a need to implement a display panel with a plurality of channels in consideration of the stability according to the specifications of devices included in a driving circuit. Accordingly, the manufacturing cost of the display device 100 may increase, and the size of the circuit of the display device 100 and the number of parts thereof may increase. The display device 100 according to various embodiments of the disclosure may control the display panel 120 with the small number of channels (e.g., a single channel) by dropping the voltage input to the driving circuit for driving the display panel 120.

Figure 2:
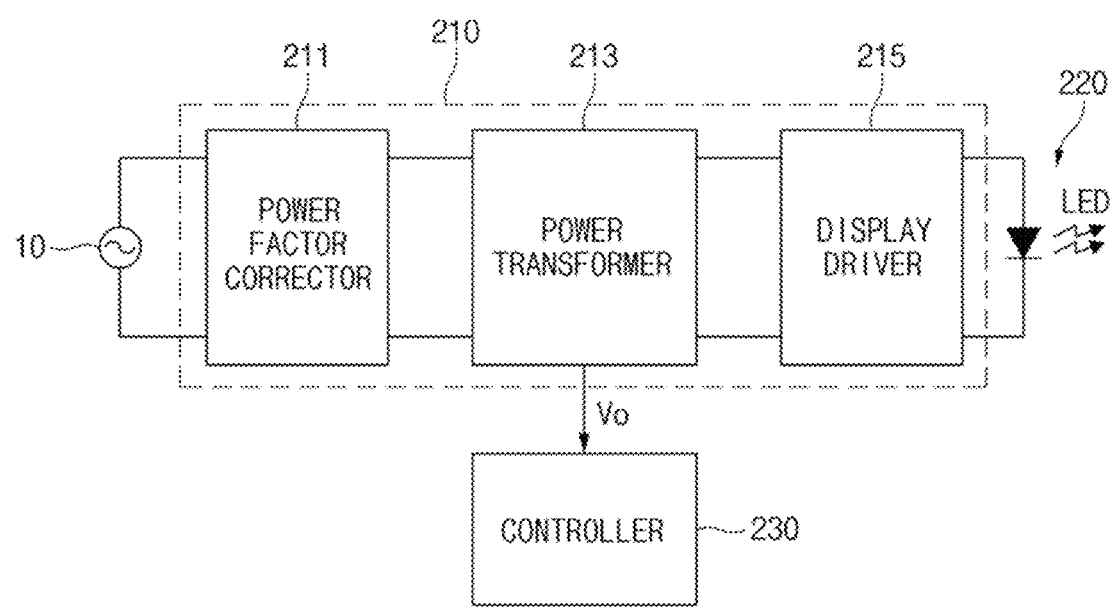
FIG. 2 is a block diagram showing a configuration of a power supply unit of a display device according to various embodiments.

FIG. 2 is a block diagram showing a configuration of a power supply unit of a display device according to various embodiments.

Referring to FIG. 2, a power supply unit 210 (e.g., the power supply unit 110 of FIG. 1) may include a power factor corrector 211, a power transformer 213, and a display driver 215.

According to an embodiment, the power supply unit 210 may receive power from the external power supply 10. For example, the power supply unit 210 may receive AC power from the external power supply 10. For example, the received AC power may be converted into DC power through a rectifier (not illustrated).

According to an embodiment, the power factor corrector 211 may correct the power factor of the input power. For example, the power factor corrector 211 may correct the power factor of the input power based on the voltage at a specified point. For example, the power factor corrector 211 may correct the power factor based on the output voltage of the power factor corrector 211. In other words, the power factor corrector 211 may correct the power factor of the DC power by feeding the output voltage back. According to an embodiment, the power factor corrector 211 may output a specified voltage. For example, the power factor corrector 211 may output the specified voltage through the DC power, of which the power factor is corrected.

According to an embodiment, the power transformer 213 may convert the input voltage to a specified gain. For example, the power transformer 213 may convert the voltage output from the power factor corrector 211 to the specified gain. According to an embodiment, the power transformer 213 may apply the voltage, of which the gain is converted, to each configuration of the display device 100. For example, the power transformer 213 may apply the voltage, of which the gain is converted, to a display panel 220 (e.g., the display panel 120 in FIG. 1) and a controller 230 (e.g., the controller 130 in FIG. 1. The power transformer 213 may convert voltage by applying different gains depending on a configuration of each display device.

According to an embodiment, the display driver 215 may supply a driving voltage necessary to display an image on the display panel 220. For example, the display driver 215 may convert the input voltage based on a control signal (e.g., a dimming signal) for outputting an image and may apply the converted voltage to the display panel 220. For example, the control signal may be received from the controller 130.

According to an embodiment, the display driver 215 may include a voltage drop unit (not illustrated) for dropping a voltage input (or applied) to the display driver 215. For example, the voltage drop unit may drop the voltage input to the display driver 215 through the power transformer 213. According to an embodiment, the display driver 215 may increase the number of light emitting devices (e.g., LEDs) capable of being disposed in a single channel, based on the voltage drop of the voltage drop unit. Accordingly, the number of driving circuits of the display driver 215 and the number of channels of the display panel 220 may be reduced. For example, a plurality of (e.g., two) driving circuits included in the display driver 215 and a plurality of (e.g., two) channels included in the display panel 220 may be integrated into a single driving circuit and a single channel, respectively.

Figure 3:
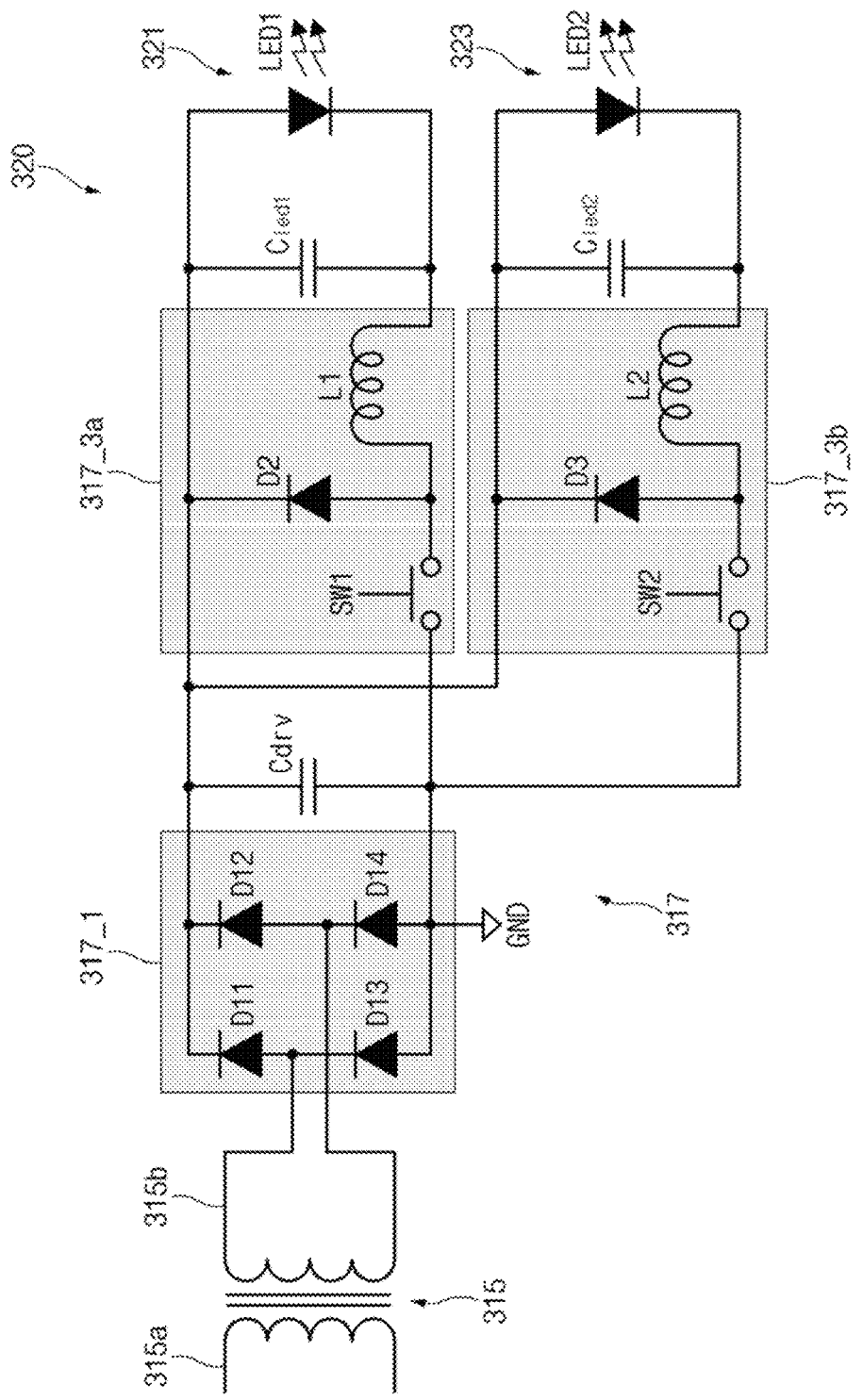
FIG. 3 illustrates the configuration of a display driver where a high voltage is applied to the LED channel.

FIG. 3 illustrates the configuration of a display driver where a high voltage is applied to the LED channel.

Referring to FIG. 3, a display panel 320 may include a plurality of channels 321 and 323 and a plurality of driving circuits corresponding to the plurality of channels 321 and 323.

A power transformer 315 may convert the voltage input to a primary-side coil 315a into a specified gain and may output the converted voltage to a display driver 317 through a secondary-side coil 315b.

The display driver 317 may include a rectifier 317_1, a first converter 317_3a, and a second converter 317_3b. According to an embodiment, the display driver 317 is not limited to the above-described configuration. For example, the rectifier 317_1 may not be included in the display driver 317 but may be included in another portion (or other configuration) of the power supply unit (e.g., the power supply unit 210 in FIG. 2). In other words, the display driver 317 may receive the rectified voltage from a rectifier included in another portion.

The rectifier 3171 may rectify the input voltage. The rectifier 317_1 may include a plurality of diodes D11, D12, D13, and D14 to rectify the input voltage. For example, the plurality of diodes D11, D12, D13, and D14 may constitute a bridge circuit. The voltage output from the rectifier 317_1 may be delivered to the first converter 317_3a and the second converter 317_3b through a first capacitor $C_{drv}$.

The first converter 317_3a and the second converter 317_3b may output the voltage input through inductors L1 and L2 and capacitors Cled1 and Cled2 to the first channel 321 and the second channel 323 of the display panel 320. A controller (not illustrated) (e.g., the controller 230 of FIG. 2) may control switches SW1 and SW2 included in the first converter 317_3a and the second converter 317_3b to convert the input voltage. The first converter 317_3a and the second converter 317_3b may include diodes D2 and D3 for maintaining the flow of current in one direction.

In a state where the light emitting device of the display panel 320 is composed of the two channels 321 and 323, in consideration of the stability according to the capacity of the inductors L1 and L2, and capacitors Cled1 and Cled2 included in the display driver 317, the display driver 317 may supply voltage to the display panel 320 through the two converters 317_3a and 317_3b. Accordingly, the size of the display device (e.g., the display device 100 of FIG. 1) and the number of parts thereof may increase, and the manufacturing cost may increase.

Figure 4A:
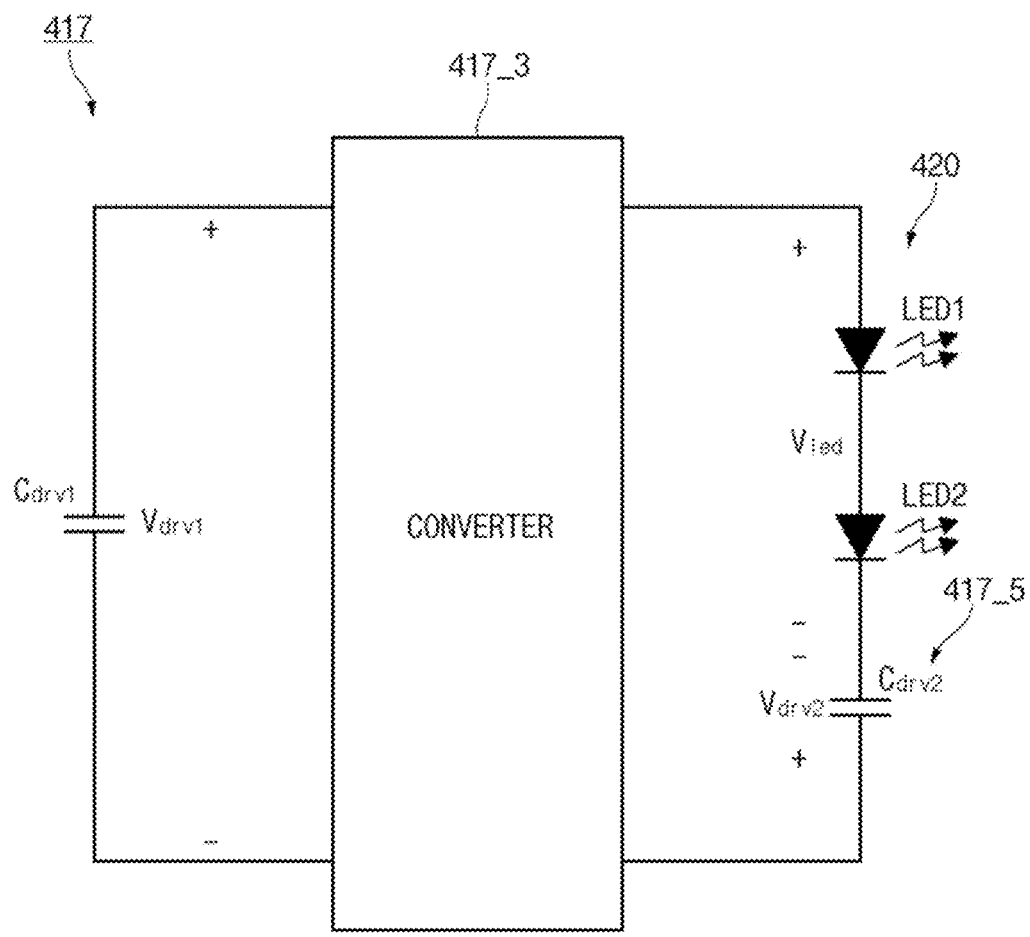
FIGS. 4A and 4B are conceptual views illustrating a configuration of a display driver according to various embodiments.
Figure 4B:
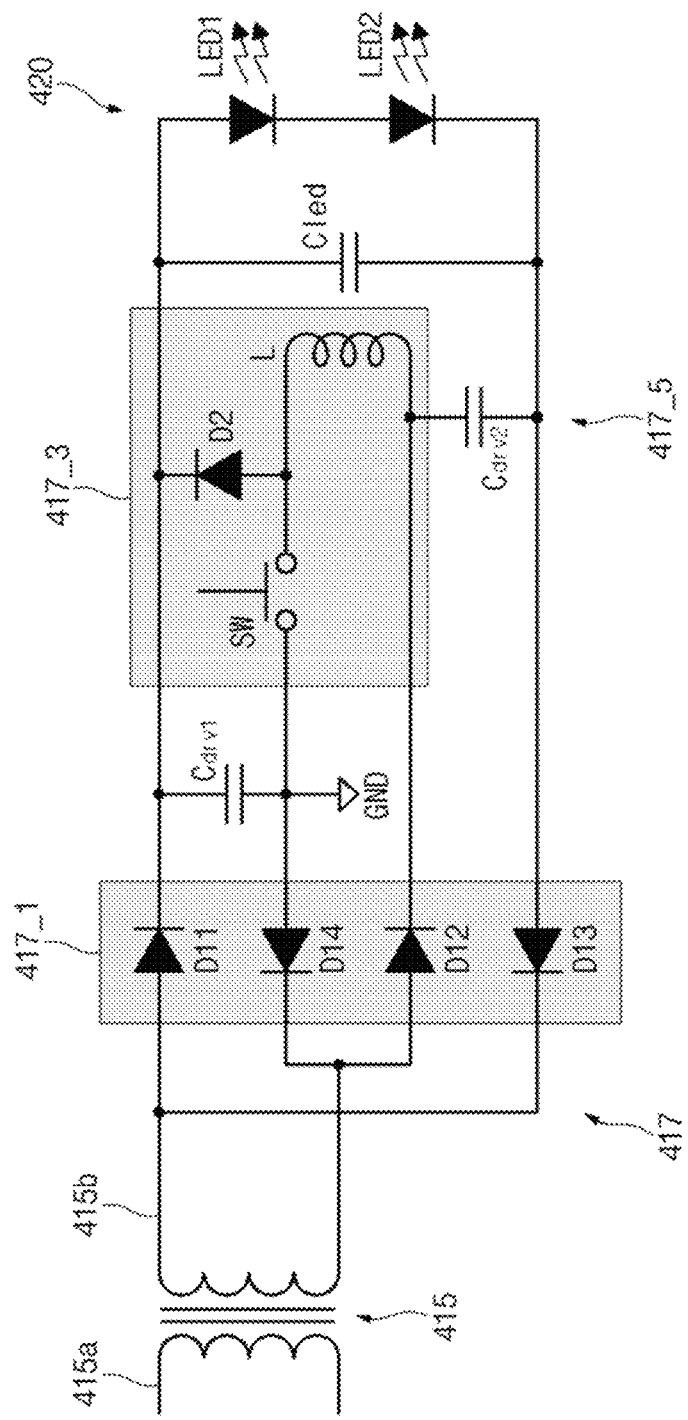

FIGS. 4A and 4B are conceptual views illustrating a configuration of a display driver according to various embodiments.

Referring to FIG. 4A, a display driver 417 (e.g., the display driver 215 in FIG. 2) may supply voltage to a display panel 420 (e.g., the display panel 220 in FIG. 2) composed of a single channel.

According to an embodiment, a converter 417_3 of the display driver 417 may receive a voltage output from a rectifier (not illustrated) through a first capacitor $C_{drv1}$. The first capacitor $C_{drv1}$ may be charged with a first voltage $V_{drv1}$ by receiving the voltage output from the rectifier. For example, the converter 417_3 may include a buck converter.

According to an embodiment, the converter 417_3 may convert the first voltage $V_{drv1}$ output through the first capacitor $C_{drv1}$ and then apply the converted voltage to the single channel of the display panel 420. For example, the converter 417_3 may apply a second voltage $V_{led}$ to the single channel. According to an embodiment, the display panel 420 may output an image through the single channel. For example, the single channel may include light emitting elements disposed in each of the two channels in FIG. 3. In other words, in FIG. 3, the light emitting elements disposed in the two channels may be disposed in the single channel.

According to an embodiment, a voltage drop unit 417_5 may be connected in series to the display panel 420. According to an embodiment, the voltage drop unit 417_5 may include a second capacitor $C_{drv2}$. For example, the second capacitor $C_{drv2}$ may be charged to a second voltage $V_{drv2}$ by the voltage output from a rectifier (not illustrated). Accordingly, the magnitude of the first voltage $V_{drv1}$ input to the converter 417_3 (e.g., a buck converter) is greater than the sum of the magnitude of the second voltage $V_{led}$ applied to the display panel 420 and the magnitudes of the second voltage $V_{drv2}$, which is voltage drop and which is applied to the second capacitor Cdrv2 ($V_{drv1} > V_{led} - V_{drv2}$), and thus the condition of the buck converter is established. Even though two channels are driven, the voltage applied to the buck converter 417_3 may be similar to or lower than the voltage applied to a single channel, and thus the display panel 420 may be implemented with the single channel without upgrading components of a switch SW, a diode D2, and an inductor L.

Referring to FIG. 4B, the display driver 417 (e.g., the display driver 215 of FIG. 2) may convert the voltage input through a power transformer 415 and may supply the converted voltage to the display panel 420.

According to an embodiment, the display driver 417 may include a rectifier 417_1 and the converter 417_3. In this regard, the display driver 417 may include only the single converter 417_3 differently from the display driver 317 in FIG. 3 described above with reference to FIG. 3.

According to an embodiment, the rectifier 4171 may rectify the input voltage. According to an embodiment, the rectifier 417_1 may include a plurality of diodes D11, D12, D13, and D14 to rectify the input voltage. The plurality of diodes D11, D12, D13, and D14 may be connected such that current paths formed by the positive voltage and the negative voltage are different from each other. In other words, the plurality of diodes D11, D12, D13, and D14 may be differently connected to the bridge circuit of the rectifier 317_1 of FIG. 3. For example, the first diode D11 may be connected in the forward direction to the first terminal (or an anode terminal) of a secondary coil 415b electrically connected to a primary coil 415a of the power transformer 415. The second diode D12 may be connected in the forward direction to the second terminal (or a cathode terminal) of the secondary coil 415b. The third diode D13 may be connected in the reverse direction to the first terminal of the secondary coil 415b. The fourth diode D14 may be connected in the reverse direction of the second terminal of the secondary coil 415b. Accordingly, the current path formed by the positive voltage among voltages input from the power transformer 415 may be formed in the display panel 420; the current path formed by the negative voltage may be formed in the voltage drop unit 417_5. Accordingly, when the positive voltage is applied to the output terminal of the power transformer 415, a first current path through the first diode D11 and the fourth diode D14 may be formed; when the negative voltage is applied thereto, a second current path through the second diode D12 and the third diode D13 may be formed.

According to an embodiment, the display driver 417 may include the first capacitor $C_{drv1}$ connected in parallel to the first current path to output the positive voltage of the rectifier 417_1. The voltage output through the first capacitor $C_{drv1}$ may be input to the converter 417_3 to be supplied to the display panel 420.

According to an embodiment, in the converter 417_3 (e.g., a buck converter), the switch SW and the inductor L may be connected in series to the first path formed in the positive voltage of the rectifier 417_1. In addition, the converter 417_3 may include a fifth diode D2 for maintaining the flow of current in one direction. According to an embodiment, the converter 417_3 may convert the input voltage by controlling the on/off of the switch SW by a controller (e.g., the controller 230 of FIG. 2).

According to an embodiment, the display driver 417 may include a second capacitor $C_{led}$ connected in parallel to the first current path to deliver the output of the converter 417_3. The voltage output through the second capacitor $C_{led}$ may be input to the display panel 420.

According to an embodiment, the display driver 417 may include the voltage drop unit 417_5 for dropping the voltage input to the converter 417_3.

The voltage drop unit 417_5 may be connected in parallel to the second current path. According to an embodiment, the voltage drop unit 417_5 may include a third capacitor $C_{drv2}$ for voltage drop.

Figure 5A:
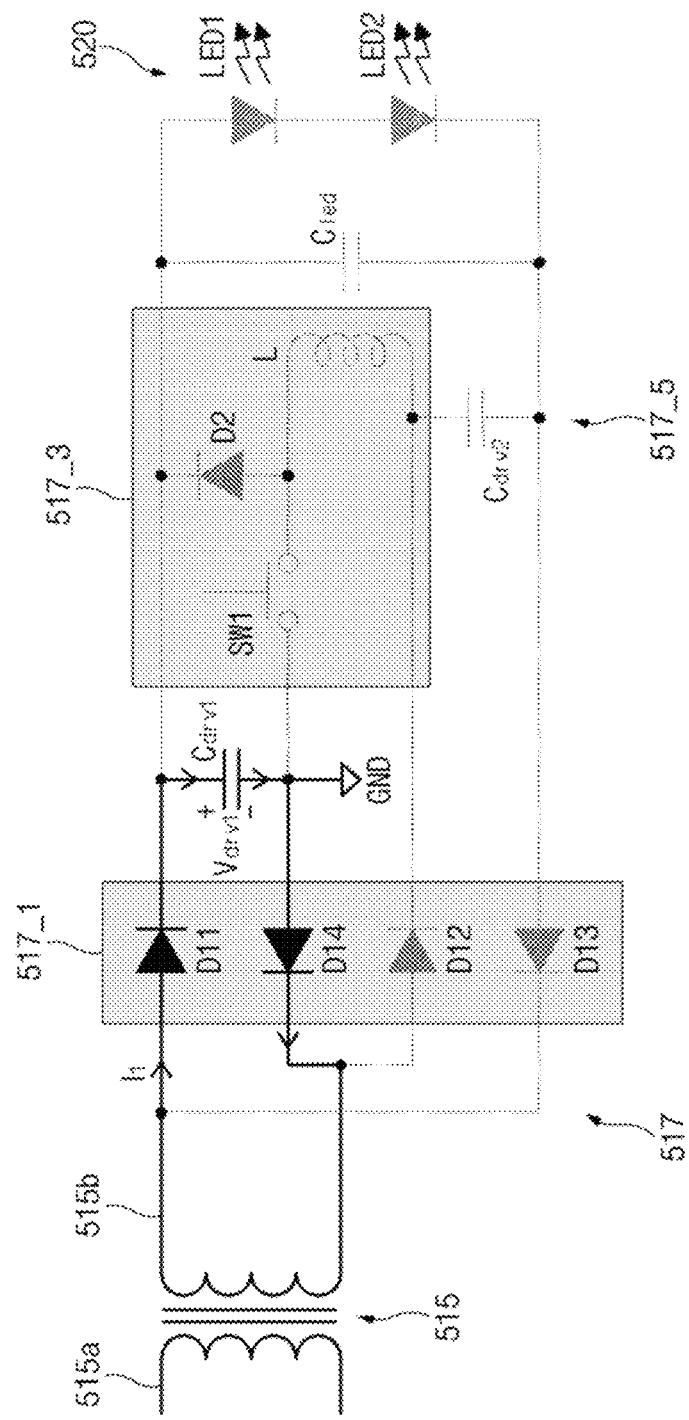
FIGS. 5A, 5B, and 5C are circuit diagrams illustrating a path of current formed when a voltage is applied to a display driver according to an embodiment.
Figure 5B:
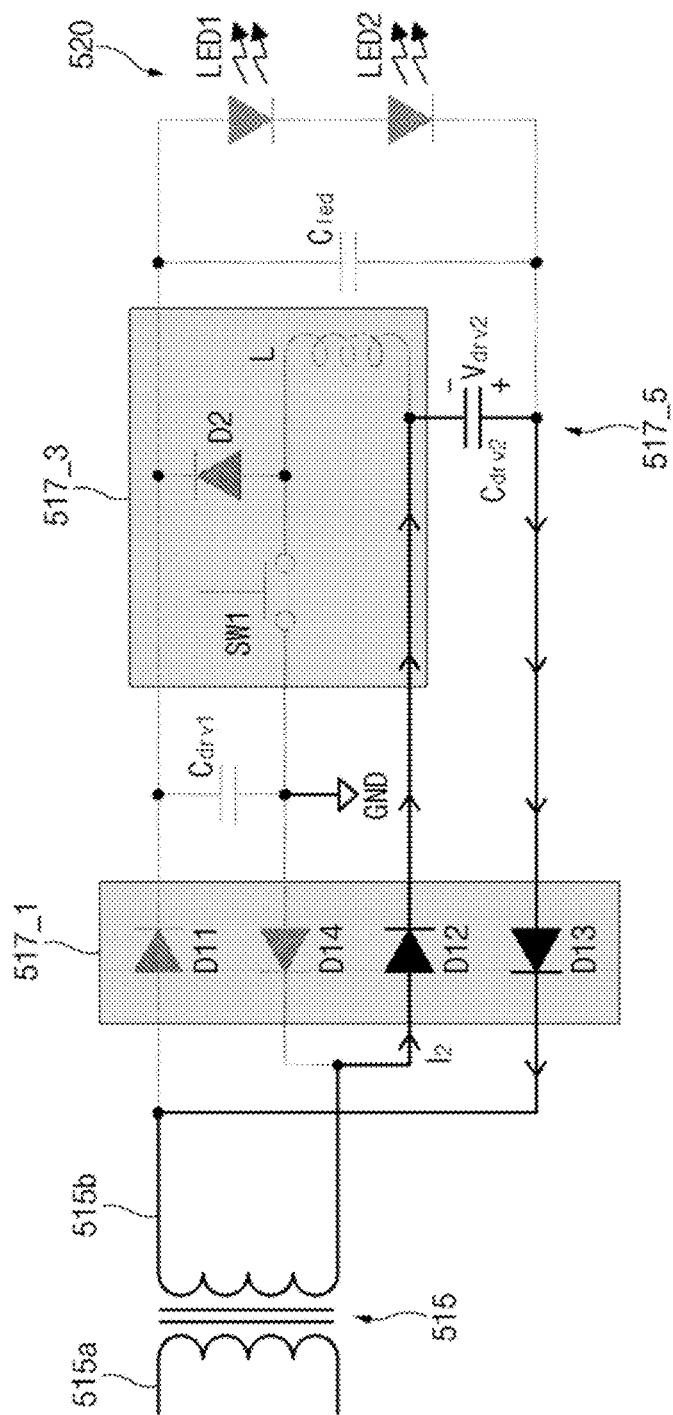
Figure 5C:
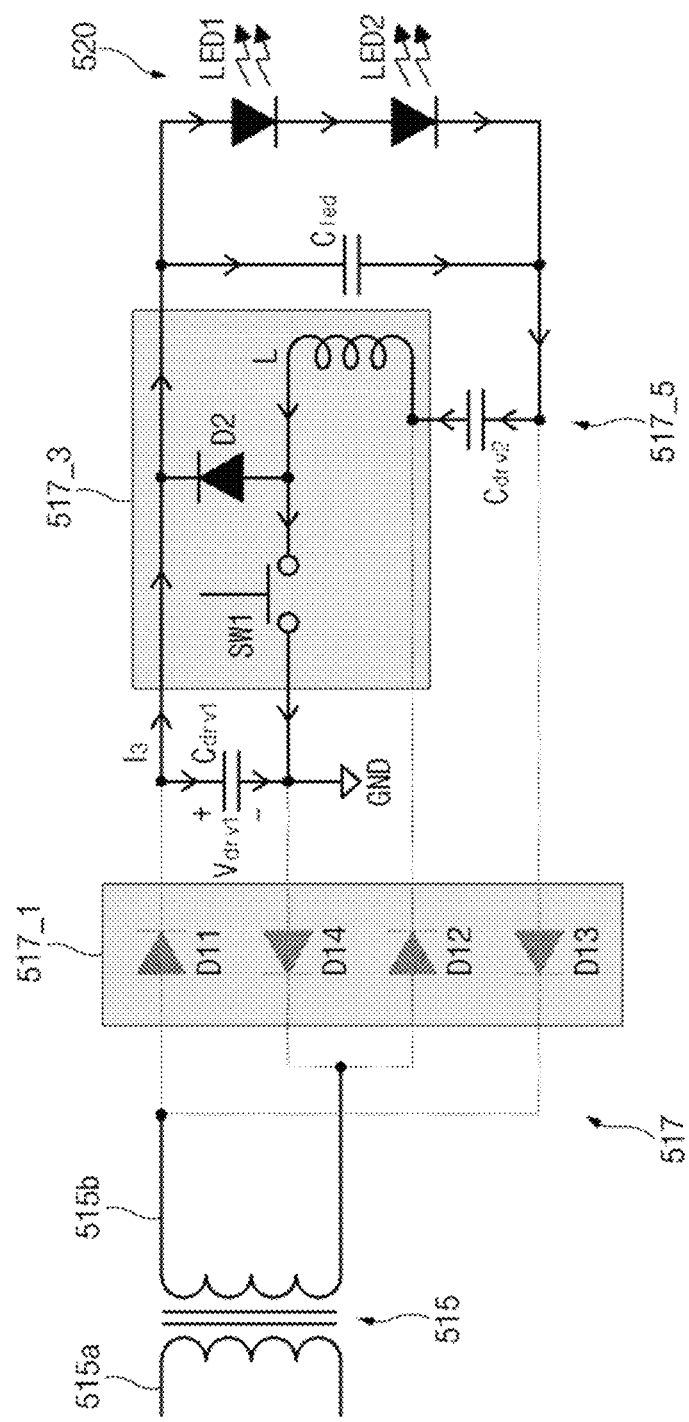

FIGS. 5A, 5B, and 5C are circuit diagrams illustrating a path of current formed when a voltage is applied to a display driver 517 according to an embodiment. In FIGS. 5A, 5B, and 5C, the same reference number may be assigned to the same or corresponding components; the redundant descriptions of components the same as or corresponding to those described above through FIGS. 4A and 4B may be omitted.

FIGS. 5A and 5B illustrate the flow of current formed by applying a voltage to a power transformer 515 according to an embodiment.

Referring to FIG. 5A, the first electrical path formed when a positive voltage is applied from the power transformer 515 (e.g., the power transformer 415 of FIG. 4) is illustrated.

According to an embodiment, a positive voltage $V_i$ may be applied to a converter 517_3 through a secondary side coil 515b electrically connected to a primary side coil 515a of the power transformer 515. According to an embodiment, the first electrical path by a first current $I_1$ may be formed. For example, the first current $I_1$ may form the first electrical path formed through the first diode D11 and the fourth diode D14 of a rectifier 517_1.

According to an embodiment, the first capacitor $C_{drv1}$ connected on the first electrical path may be charged with the first current $I_1$ at the first voltage $V_{drv1}$. In other words, both terminals of the first capacitor $C_{drv1}$ may be charged with the first voltage $V_{drv1}$.

Referring to FIG. 5B, the second electrical path formed when a negative voltage is applied from the power transformer 515 is illustrated.

According to an embodiment, a negative voltage $-V_i$ may be applied to the converter 517_3 through the secondary side coil 515b electrically connected to the primary side coil 515a of the power transformer 515. According to an embodiment, the second electrical path by a second current $I_2$ may be formed. For example, the second current $I_2$ may form the second electrical path formed through the second diode D12 and the third diode D13 of the rectifier 517_1.

According to an embodiment, the third capacitor $C_{drv2}$ connected on the first electrical path may be charged with the second current $I_2$ at a third voltage $V_{drv2}$. Accordingly, the voltage input to the converter 517_3 of FIG. 5A on the first electrical path in FIG. 5A may be dropped.

FIG. 5C illustrates the flow of current in the case where a voltage is supplied to a display panel 520 by the charged first capacitor $C_{drv1}$.

Referring to FIG. 5C, the converter 517_3 may receive the first voltage $V_{drv1}$ through the first capacitor $C_{drv1}$. The second voltage $V_{led}$ at both terminals of the display panel 520 may be determined depending on the flow of a third current $I_3$ changed depending on the on/off state of the switch SW. Accordingly, the display panel 520 may receive the second voltage $V_{led}$ through the second capacitor $C_{led}$. According to an embodiment, the display panel 520 may display an image by the input second voltage $V_{led}$.

Figure 6:
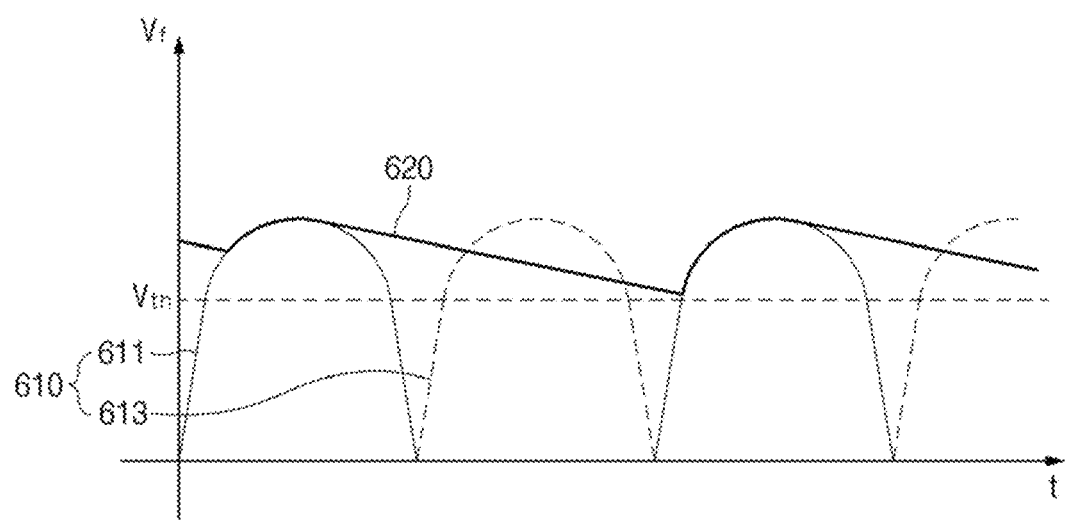
FIG. 6 is a graph illustrating a secondary side voltage source, which rectifies an AC voltage output through a power transformer into a DC voltage, according to an embodiment.

FIG. 6 is a graph illustrating a secondary side voltage source, which rectifies an AC voltage output through a power transformer into a DC voltage, according to an embodiment.

Referring to FIG. 6, a display panel (e.g., the display panel 120 in FIG. 1) may receive the voltage required by a converter (e.g., 517_3 of FIG. 5A, 5B, or 5C), and may receive an input voltage 620 as illustrated in FIG. 6 by a positive voltage applied through a rectifier.

According to an embodiment, the display driver may receive a voltage by a positive voltage 610 charged in the first capacitor $C_{drv1}$ among the rectified voltages supplied through the rectifier 417_1 illustrated in FIG. 4B. Accordingly, the input voltage of the display driver may be formed depending on a voltage 611 by the positive voltage. According to an embodiment, the display panel may receive a voltage by a negative voltage 613 of the rectified voltage 610 supplied through the rectifier of a power transformer.

According to an embodiment, the voltage 620 at both terminals of the display panel, which receives the voltage by the positive voltage, among the rectified voltage 610 may not be less than the minimum voltage $V_{th}$ for displaying the image normally. In other words, the voltage supplied to the display panel through a display driver may not be less than the voltage capable of displaying the image on the display panel without the distortion for image information. Accordingly, similarly to the conventional display device, the display device may maintain the performance for displaying an image.

The display device 100 according to various embodiments of the disclosure described with reference to FIGS. 1 to 6 may determine the second voltage $V_{led}$ of the circuit for driving the display panel 120 depending on the flow of current that changes according to the on/off state of the switch SW. Accordingly, the display panel 520 may receive the second voltage $V_{led}$ through the second capacitor $C_{led}$. According to an embodiment, the display panel 520 may display an image by the input second voltage $V_{led}$. In a state where the stability and performance of the display device 100 are maintained, the number of channels for controlling the display panel 120 having a specified size or higher may be reduced, the sizes and number of parts of the display device 100 may be reduced, and the manufacturing cost of the display device 100 may be reduced, by dropping a voltage.

According to various embodiments described above, a display device (e.g., 100 in FIG. 1) may include a power transformer (e.g., 415 in FIG. 4B) converting an input voltage into a specified voltage, a display driver (e.g., 417 in FIG. 4B) including a rectifier (e.g., 417_1 in FIG. 4B) rectifying a voltage converted through the power transformer and a converter (e.g., 417_3 in FIG. 4B) converting a voltage rectified through the rectifier based on a control signal for outputting an image, and a display panel (e.g., 420 in FIG. 4B) receiving a converted voltage through the display driver to display the image.

According to various embodiments, the display driver includes a voltage drop unit (e.g., 417_5 in FIG. 4B) dropping a voltage input through the rectifier.

According to various embodiments, the voltage drop unit may be connected in series to the display panel.

According to various embodiments, the voltage drop unit may be connected on a path of a current formed by a negative voltage applied by the rectifier.

According to various embodiments, the rectifier may apply a positive voltage to the converter to supply a first current to the display panel and may apply a negative voltage to the converter to supply a second current to the voltage drop unit.

According to various embodiments, the voltage drop unit may include a capacitor (e.g., $C_{drv2}$ in FIG. 4B).

According to various embodiments, a voltage supplied to the display panel through the display driver may be not less than a voltage capable of displaying an image on the display panel without loss for image information.

According to various embodiments, the converter may be a buck converter.

According to various embodiments, the display panel may display an image by a specified size or more.

According to various embodiments, the display panel may include pixels, of which a number is not less than a specified number.

According to various embodiments, the display panel may receive a specified voltage or higher to operate.

According to various embodiments, at least part of a device (e.g., modules or functions thereof) or a method (e.g., operations) may be, for example, implemented by instructions stored in a computer-readable storage media in the form of a program module. The instruction, when executed by a processor, may cause the processor to perform a function corresponding to the instruction. The computer-readable recording medium may include a hard disk, a floppy disk, a magnetic media (e.g., a magnetic tape), an optical medium (e.g., a compact disc read only memory (CD-ROM) and a digital versatile disc (DVD), a magneto-optical media (e.g., a floptical disk)), an embedded memory, or the like. The one or more instructions may contain a code made by a compiler or a code executable by an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A display device comprising:
   a power transformer configured to convert an input voltage into a specified voltage;
   a display driver including a rectifier configured to rectify the voltage converted through the power transformer and a converter configured to convert the voltage rectified through the rectifier based on a control signal for outputting an image; and
   a display panel configured to receive the converted voltage through the display driver to display the image,
   wherein the display driver includes a voltage drop circuit configured to drop a voltage input through the rectifier, and
   wherein the rectifier applies a positive voltage to the converter to supply a first current to the display panel and applies a negative voltage to the converter to supply a second current to the voltage drop circuit.

2. The display device of claim 1, wherein the voltage drop circuit is connected in series to the display panel.

3. The display device of claim 1, wherein the voltage drop circuit is connected on a path of the second current formed by the negative voltage applied by the rectifier.

4. The display device of claim 1, wherein the voltage drop circuit includes a capacitor.

5. The display device of claim 1, wherein a voltage supplied to the display panel through the display driver is not less than a voltage capable of displaying the image on the display panel without loss for image information.

6. The display device of claim 1, wherein the converter is a buck converter.

7. The display device of claim 1, wherein the display panel displays the image by a specified size or more.

8. The display device of claim 1, wherein the display panel includes pixels, of which a number is not less than a specified number.

9. The display device of claim 1, wherein the display panel receives a specified voltage or higher to operate.

* * * * *